2,956,066

PROCESS FOR PREPARING 10-AMINODECANOIC ACID AND ITS ESTERS, AND NEW PRODUCTS THEREOF

Francesco Minisci, Milan, Italy, assignor to Societa Generale per l'Industria Mineraria e Chimica, a corporation of Italy No Drawing. Filed Nov. 24, 1958, Ser. No. 775,688

Claims priority, application Italy Nov. 28, 1957

15 Claims. (Cl. 260—404)

This invention relates to a process of preparing 10-aminodecanoic acid and esters of said acid, and also to new compounds produced in various stages of said process.

10-aminodecanoic-1-acid and its esters are useful intermediates for preparing polyamide fibers. The esters of aminodecanoic acid can be used directly for producing polyamides without passing through the aminoacid.

The present invention relates to a new process for preparing 10-aminodecanoic acid and its esters, which, in comparison with the known processes, presents the advantages of a better yield and of greater commercial convenience.

It has been found that 10-aminodecanoic acid can advantageously be prepared from 1,8-dicyano-2,6-octadiene by first transforming this dinitrile into the monoester, and then hydrogenating the nitrile group and the olefinic bounds present in the monoester, and finally hydrolyzing the hydrogenated products. This is done according to the following multi-stage reaction scheme:

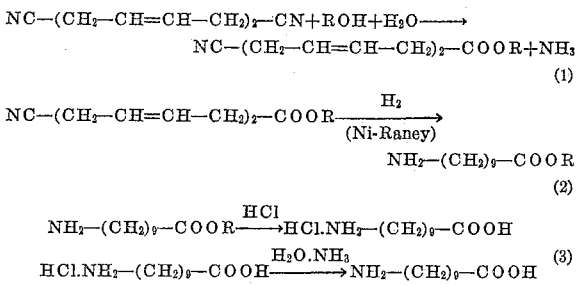

The first stage or operation is realized by reacting dicyanonitrile with an alcohol in the presence of suitable amounts of mineral acids, such as $H_2SO_4$ or HCl, and water, at temperatures of between 50° and 160° C., preferably. The alcohols used are preferably lower aliphatic alcohols having from 1 to 5 carbon atoms.

The course of the reaction depends on the weight ratio between the reactants, on the duration, and on the temperature of the reaction.

Together with the monoester

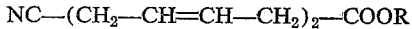

a certain amount of diester is always formed, of the formula:

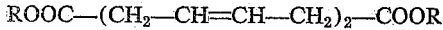

The latter can be transformed into sebacic diester and then into sebacic acid. In order to obtain high yields of monoester it is necessary to limit the conversion of the dinitrile. With conversions lower than 20% the converted product practically consists of the monoester, the diester being present only as traces. In order not to lower the yields of monoester unduly, it is preferable not to surpass conversions of 70%. A conversion of 20 to 50% is preferred.

Limited conversions can be obtained by using the reactants, namely dinitrile, acid, and water, in stoichiometric ratio and in the presence of excess alcohol, and stopping the reaction after a period of time depending on the reaction conditions, that is, the nature of the acid, the alcohol and the temperature. The alcohol is preferably used in the ratio of two to ten moles per mole of the nitrile. This is two to ten times the theoretical amount. It is, however, preferable to operate with acid to dinitrile ratios lower than the stoichiometric ratio, because this makes it possible to stop the conversion at the desired value, with a certain degree of independence with respect to the duration and the temperature of the reaction. The mole ratio of acid to nitrile is preferably between 0.3 and 0.8. The water is used in stoichiometrical or higher amounts.

Separation of the reaction products is obtained by fractionally distilling the raw reaction product, which is previously subjected to a mild alkaline washing with sodium bicarbonate or other mild alkali, e.g. CaO, MgO, etc., to eliminate traces of acid present.

The diester present, if any, can also be separated after the hydrogenation, by taking up the hydrogenated product with an acid solution, the aminoester being solubilized while the sebacic diester remains undissolved.

The hydrogenation can be carried out, in a single stage, with hydrogen in the presence of ammonia and of hydrogenation catalysts. Raney nickel catalyst can be used and the process carried out under a hydrogen pressure between 1 and 200 atmospheres, at 20° to 150° C. However, higher yields and a purer product are obtained by operating in two selective stages, namely by first hydrogenating the double bonds, using palladium as a catalyst, for example, and then the nitrile group by using Ni-Cr (Raney) and sodium hydroxide, for example.

The esters of 10-aminodecanoic acid can be transformed into the corresponding aminoacid by hydrolysis and subsequent decomposition of the salt of the aminoacid. The 9-cyano-nonadienoic acid esters obtained as intermediates by the first esterification are new products which are of particular interest for preparing aminodecanoic acid and its esters. Although the three stages of the process are reactions of a general character, they require particular precaution as concerns the products desired, because the starting material has two nitrile functions and two double bonds. For instance, the alcoholysis of the dicyano-octadiene requires slightly more drastic conditions than sebacic dinitrile which is the corresponding saturated compound for which the alcoholysis is known. Moreover, the monesters derived from dicyano-octadiene are less stable against alkalies than the corresponding products obtained from sebacic dinitrile. For these reasons, the alkaline washing should be very moderate and the catalytic hydrogenation, which is carried out in the presence of ammonia or sodium hydroxide, will be more conveniently executed in two stages, the first of which being carried out in absence of alkalies (see Example 3 below).

The hydrolysis can be carried out at the same time as the hydrogenation, in case the latter is executed in the presence of sodium hydroxide.

The following examples are illustrative, and are not intended to limit the present invention.

Example 1

160 g. 1.8-dicyano-2,6-octadiene, 64 g. methanol, 13.6 g. water and 49 g. 100% sulfuric acid are refluxed for 4 hours, while agitating. The excess alcohol is then distilled off, the residue being washed with a bicarbonate solution and subjected to fractional distillation.

At 118–120° (0.2 mm. Hg) 64 g. monomethylester are collected, containing 7.35% N (theoretical content 7.24%). 93 g. dicyano-octadiene are recovered, and may be recycled to the process. 193 grams of the methyl ester of 9-cyano-nonadienoic acid in 300 cc. ethyl alcohol are subjected to the action of hydrogen, at 100 atm., in the presence of ammonia and nickel Raney in an autoclave, while stirring. The temperature is 70–80° C. When the hydrogen absorption has ceased the solution is filtered and alcohol is dstilled off. The solid residue consists of the methyl ester of 10-aminodecanoic acid (yield 140 g.). When distilled it passes over at 105° C., under 0.4 mm. Hg, and the distillate solidifies by cooling. During the distillation a partial polycondensation of the product takes place with the formation of polyamides. The hydrogenated product is refluxed with a hydrochloric acid solution. Upon cooling, 160 g. hydrochloride of 10-aminodecanoic acid, melting at 158° C., crystallize. By neutralizing the aqueous solution of the hydrochloride with ammonia, 10-aminodecanoic acid, melting at 177–178° C. is quantitatively obtained.

*Example 2*

160 g. 1.8-dicyano-2,6-octadiene, 92 g. ethanol, 13.6 g. water and 49 g. sulfuric acid are treated as in the preceding example.

72 g. ethyl monoester are obtained and 91 g. dicyano-octadiene are recovered.

207 g. ethyl ester of 9-cyano-nonadienoic acid are hydrogenated under the same conditions as for the methyl ester (see Example 1).

152 g. ethyl ester of 10-amino-decanoic acid are obtained.

By boiling with a hydrochloric acid solution, the hydrochloride of 10-aminodecanoic acid is obtained which, by decomposition with ammonia, yields the corresponding aminodecanoic acid.

*Example 3*

193 g. methyl ester of 9-cyano-nonadienoic acid are dissolved in 1500 cc. methanol containing 1.3 g. palladium precipitated on calcium carbonate, and subjected to the action of hydrogen under ordinary pressure until the absorption has ceased. The hydrogenation temperature was 20–25° C.

The catalyst is filtered and the solution is subjected to hydrogenation in the presence of 43 g. sodium hydroxide, or of a corresponding amount of KOH or any other caustic alkali of an alkali metal, and Ni-Cr (Raney). The hydrogen pressure is 40 atm., and the temperature 60° C.

The catalyst is separated and methanol is distilled off; the residue is taken up again with water, neutralized with a slight excess of hydrochloric acid, and then treated with ammonia. 158 g. 10-aminodecanoic acid, melting at 175–177° C., are precipitated.

If the caustic alkali employed in the second hydrogenation stage is used in catalytic amount, such as less than 2% of the theoretical value, the product is the amino acid ester. If the caustic alkali is employed in amounts slightly greater than the stoichiometrical amount, the corresponding alkaline salt of the amino acid is obtained at that stage, as revealed in Example 3.

Other salts of the monoester of 9-cyano-nonadienoic acid can obviously be made by methods obvious to chemists.

Also the transformation of esters of amino acids into the corresponding polyamides is a process known per se in the literature. The polycondensation of the esters of amino-decanoic acid has no particularity distinct from the known process. It is carried out by subjecting the amino ester to the action of heat (100–300° C.) in inert gas (usually nitrogen) atmosphere.

I claim:

1. A process of making 10-aminodecanoic-1-acid, comprising treating 1,8-dicyano-2,6-octadiene of the formula:

NC—CH$_2$—CH=CH—CH$_2$—CH$_2$—CH=CH—CH$_2$CN with an alkanol in the presence of mineral acid to obtain the monoester of 9-cyano-nonadienoic acid of the formula:

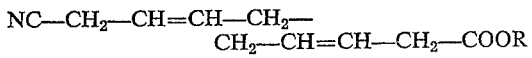

in which R is the alkyl radical of the alkanol, and subjecting said monoester to hydrogenation and hydrolysis.

2. The process of claim 1, the alkanol having from 1 to 5 carbon atoms.

3. A process of making a monoester of 9-cyano-nonadienoic acid of the formula:

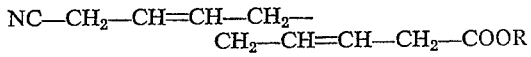

in which R is the alkyl radical of an alkanol having from 1 to 5 carbon atoms, comprising treating 1,8-dicyano-2,6-octadiene with said alkanol in the presence of mineral acid.

4. The process of claim 3, the alkanol being methanol.

5. The process of claim 3, the alkanol being ethanol.

6. A process of making a monoester of 9-cyano-nonadienoic acid of the formula:

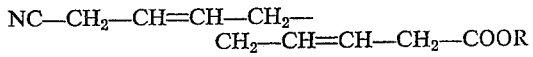

in which R is the alkyl radical of an alkanol having from 1 to 5 carbon atoms, comprising treating 1,8-dicyano-2,6-octadiene with said alkanol, said treatment being carried out in the presence of a mineral acid and water at between 50° and 160° C.

7. A process of making a monoester of 9-cyano-nonadienoic acid of the formula:

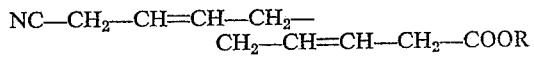

in which R is the alkyl radical of an alkanol having from 1 to 5 carbon atoms, comprising treating 1,8-dicyano-2,6-octadiene with said alkanol, said treatment being carried out in the presence of a mineral acid and water at between 50° and 160° C., the alkanol being present in the ratio of about 2 to 10 moles per mole of the nitrile, the water being present in at least stoichiometric amount, and stopping the reaction when the conversion is lower than 70 percent.

8. The process of claim 7, the mole ratio of mineral acid to nitrile being between about 0.3 and 0.8.

9. A process of making 10-aminodecanoic-1-acid, comprising treating 1,8-dicyano-2,6-octadiene of the formula:

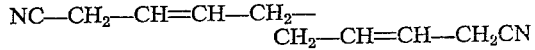

with an alkanol in the presence of mineral acid to obtain the monester of 9-cyano-nonadienoic acid of the formula:

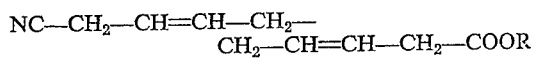

in which R is the alkyl radical of the alkanol, separating said monoester from the reaction products and subjecting it to catalytic hydrogenation with hydrogen in the presence of Raney nickel catalyst, under a hydrogen pressure between 1 and 200 atmospheres, at a temperature between 20° and 150° C.

10. The process of claim 9, the hydrogenation being carried out in the presence of ammonia, the hydrogenated product being refluxed with aqueous hydrochloric acid followed by neutralization with ammonia.

11. A process of making 10-aminodecanoic-1-acid, comprising treating 1,8-dicyano-2,6-octadiene of the formula:

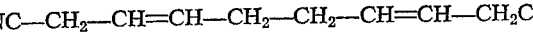

with an alkanol in the presence of mineral acid to obtain the monoester of 9-cyano-nonadienoic acid of the formula:

NC—CH$_2$—CH=CH—CH$_2$—
  CH$_2$—CH=CH—CH$_2$—COOR in which R is the alkyl radical of the alkanol, separating said monoester from the reaction products and subjecting the monoester to catalytic hydrogenation with hydrogen in the presence of palladium to first hydrogenate the double bonds, and thereafter hydrogenating the nitrile group by treatment with Raney nickel-chromium catalyst and alkali metal hydroxide.

12. A process of making 10-aminodecanoic-1-acid, comprising subjecting the monoester of 9-cyano-nonadienoic acid of the formula:

NC—CH$_2$—CH=CH—CH$_2$—
  CH$_2$—CH=CH—CH$_2$—COOR in which R is the alkyl radical of an alkanol having from 1 to 5 carbon atoms, to a first stage hydrogenation with hydrogen in the presence of palladium to first hydrogenate the double bonds, and thereafter to a second stage hydrogenation of the nitrile group by treatment with Raney nickel-chromium catalyst and a caustic alkali, and then treating with acid and thereafter with ammonia.

13. A process comprising subjecting the monoester of 9-cyano-nonadienoic acid of the formula:

NC—CH$_2$—CH=CH—CH$_2$—
  CH$_2$—CH=CH—CH$_2$—COOR in which R is the alkyl radical of an alkanol having from 1 to 5 carbon atoms, to hydrogenation by treatment with hydrogen in the presence of Raney nickel catalyst, under a hydrogen pressure of 1 to 200 atmospheres, at a temperature between 20° and 150° C., in the presence of ammonia, to hydrogenate the double bonds and the nitrile group.

14. The process of claim 13, and subjecting the hydrogenation product to hydrolysis by heating it with aqueous hydrochloric acid, and then neutralizing, to obtain 10-amino-decanoic-1-acid.

15. A monoester of 9-cyano-nonadienoic acid of the formula:

NC—CH$_2$—CH=CH—CH$_2$—
  CH$_2$—CH=CH—CH$_2$—COOR in which R is a saturated hydrocarbon alkyl radical having from 1 to 5 carbon atoms.

No references cited.

UNITED STATES PATENT OFFICE
CERTIFICATION OF CORRECTION

Patent No. 2,956,066                                October 11, 1960

Francesco Minisci

It is hereby certified that error appears in the above numbered patent requiring correction and that the said Letters Patent should read as corrected below.

In the grant, lines 2 and 12, and in the heading to the printed specification, lines 5 and 6, name of assignee, for "Societa Generale per l'Industria Mineraria e Chimica", each occurrence, read -- Montecatini Societa Generale per l'Industria Mineraria e Chimica --.

Signed and sealed this 2nd day of May 1961.

(SEAL)
Attest:

ERNEST W. SWIDER                                     DAVID L. LADD
Attesting Officer                                         Commissioner of Patents